INVENTOR.
JOHN K. DAVIS

Jan. 27, 1970  J. K. DAVIS  3,492,075
OPHTHALMIC LENS DEMONSTRATING APPARATUS AND THE LIKE
Filed Oct. 22, 1965  2 Sheets-Sheet 2

INVENTOR.
JOHN K. DAVIS
BY
ATTORNEY

United States Patent Office 3,492,075
Patented Jan. 27, 1970

3,492,075
OPHTHALMIC LENS DEMONSTRATING APPARATUS AND THE LIKE
John K. Davis, East Woodstock, Conn., assignor, by mesne assignments, to Warner-Lambert Pharmaceutical Company, Morris Plains, N.J., a corporation of Delaware
Filed Oct. 22, 1965, Ser. No. 502,654
Int. Cl. G01b 9/00
U.S. Cl. 356—124          3 Claims

ABSTRACT OF THE DISCLOSURE

Apparatus for visually demonstrating, testing and measuring differing refractive characteristics of different spherical and toric ophthalmic lenses and of different parts of the same spherical or toric ophthalmic lens.

---

This invention relates to ophthalmic apparatus for use in readily visually demonstrating, testing and measuring refractive characteristics of spherical and toric lenses, and the like.

More particularly, the demonstration, testing and measuring apparatus of the present invention is of such construction and arrangement as to include means for readily receiving and operatively supporting an ophthalmic lens while image-forming light rays of an associated test chart are transmitted therethrough, means for establishing an optical path through the apparatus and for restricting the light rays of said path to a narrow beam, and means for maintaining the ophthalmic lens carried by said lens-supporting means at a predetermined fixed distance from a preselected central point in said beam while being moved angularly about said point to any one of various different positions of lateral or vertical adjustment, or both combined, in said beam and relative to an optical axis centrally disposed in said beam.

The apparatus also includes cylindrical lens means, of either concave cylindrical or convex cylindrical type, disposed in said beam and rotatable about a transversely extending axis for compensating in a continuously variable manner the effective focal power of the ophthalmic lens in one meridian thereof but without appreciably altering the effective power of the system in a second meridian at right angles thereto. In this manner, the power in the cylindrical meridian of a toric lens, for example, may be, in effect, readily compensated without materially altering the focus of the system in the other major meridian thereof. Also in a somewhat similar manner, a spherical lens under test in the apparatus may have, in effect, a cylindrical power added therto for comparison purposes, or the like. Additionally, the apparatus employs second cylindrical lens means transversely disposed in the beam of said apparatus and arranged for rotation in its own plane and about said optical axis, for effecting, in conjunction with the ophthalmic lens under test an erection of the test chart image being transmitted or viewed through the apparatus. It also substantially compensates for the minimum cylindrical power of the first cylindrical lens.

The apparatus may also include auxiliary cylindrical lens means for appreciably increasing the effective variable range thereof.

Thus by use of the novel apparatus of the present invention and by observing the conditions of the images provided thereby when the light rays are passing through different small areas of an ophthalmic lens being demonstrated or tested, such as through the center of the lens and through various other portions laterally displaced therefrom, it is an easy matter to visually compare and evaluate the refractive conditions of the lens and also an easy matter to visually compare and evaluate such a lens in respect to other lenses of the same series, or even in respect to the lenses of a different lens series.

The ophthalmic lenses of different lens series are usually designed to contain in each case a desired prescriptive power through the optical center thereof when measured from a given spaced position on the optical axis of the lens corresponding to the center-of-rotation to ocular vertex distance to be used by the wearer of the lens. Variations at off-axis locations in such lenses of different lens designs and as supplied by different manufacturers result from the fact that different combinations of curves are chosen by the designers for fulfilling given prescriptive requirements. Some selected lens series designs, while providing the central prescriptive powers desired, yield a minimum of astigmatism for oblique viewing for an infinite object distance, and, on the other hand, other lens series designs yield a minimum of astigmatism for oblique viewing for near object distances. Furthermore, any such lens series design may also attempt to simultaneously correct the meridional power error along a preselected axis of each toric lens thereof by certain amounts; which will additionally provide varying refractive conditions for the lenses. Even though such different lens series designs may vary considerably in certain respects, nevertheless, heretofore it has not been an easy matter to readily demonstrate or measure the amounts of variations between different parts of such lenses of supposedly similar prescriptive characteristics.

The present invention, however, is intended to make such comparisons of the refractive characteristics of different lenses of a series and of lenses of different lens series, including both spherical and toric prescriptions, a relatively easy matter; and in one form of the apparatus of the present invention an enlarged image from a test chart on film is projected through the lens being tested and onto a viewing screen for viewing purposes while, in another form of the apparatus, a test chart is viewed through the apparatus and through the ophthalmic lens being tested.

It is, accordingly, an object of the present invention to provide apparatus comprising means for supporting an ophthalmic lens for swinging movement to various different positions of lateral and vertical adjustment, or both combined, relative to an optical axis through the apparatus while being maintained substantially at a given distance from a selected point or location on said axis (with said distance corresponding substantially to the center-of-rotation to ocular vertex distance normally provided for an average patient), means for restricting light rays travelling through said apparatus to or from a test chart associated therewith and through the ophthalmic lens under test to paraxial and near-paraxial image-forming light rays, and cylindrically curved lens means disposed in said beam and rotatable about an axis transversely disposed relative to the optical axis of said apparatus for varying the effective power of the system under test in one meridian thereof without materially altering the power thereof in another meridian thereof at right angles thereto.

It is also an object of the invention to provide additional cylindrically-curved lens means positioned in the path of said light rays and arranged for rotational movement in its own plane in such a manner as to effect an erection of the image of the test chart being used with the apparatus as well as to compensate for the minimum cylindrical power value of the rest of the system.

It is a further object of the present invention to provide for such lens demonstration apparatus additional cylindrically-curved lens means which may be used when desired for increasing or extending in a continuously variable manner the range of effective powers of the ophthalmic lens being tested in one meridian thereof without materially altering the effective power of the lens in another meridian of the lens at right angles thereto.

Other objects and advantages of the invention will become apparent from the detailed description which follows when taken in conjunction with the accompanying drawings in which.

If the normal relationship and functioning of an ophthalmic lens relative to the eye of a patient is considered, it will be appreciated that the eye pivots about a point within the eye, or more exactly, about a set of closely related points, and thus this eye-to-lens relationship depends upon such factors as the size of the eyeball, the general anatomy of the patient's face, the different angles of viewing during normal use of the eye, and the spectacle frame design to be employed for supporting a pair of such lenses before the patient's eye. Accordingly, the variations in the center-of-rotation to ocular vertex distances for lenses for different persons has been found to provide an average value for this distance of between approximately 29½ to 31½ millimeters. Of course, larger and smaller values are also encountered and can be cared for by use of different distances.

If one were to project, for example, an image through such an ophthalmic lens and onto a viewing screen with the projection beam being successively at various different angles corresponding to the different angles of viewing through the lens, the projector would be so successively positioned behind the lens as to project through or more exactly have its optical axis at all times extend through a single imaginary axial point analogous to the average center-of-rotation point within a patient's eye. Conversely, it would be possible to have the projector held in a fixed position and arranged to move the ophthalmic lens laterally, or in any other usual angular direction desired, about a similar preselected axial point of corresponding character and thereby obtain an equivalent set of projected image conditions upon the viewing screen. This is so since the mechanical and optical situations involved in both of these suggested procedures would be identical.

Accordingly, as will presently appear, it is possible to arrange the apparatus of the present invention so that a lens to be tested may be readily centered upon a lens-supporting member of the apparatus and pivoted about a preselected fixed axial point in said apparatus while being maintained substantially at a desired fixed distance from this point, and with this distance corresponding substantially to the center-of-rotation to ocular vertex distance for which the lens has been designed. Also, it is possible to provide in the apparatus, for comparison purposes, and the like, optical means for varying, in effect, and in a continuously variable manner, the refractive power of the entire optical system in any one meridian thereof without materially altering its power in another meridian of the lens at right angles thereto.

Figure 1:
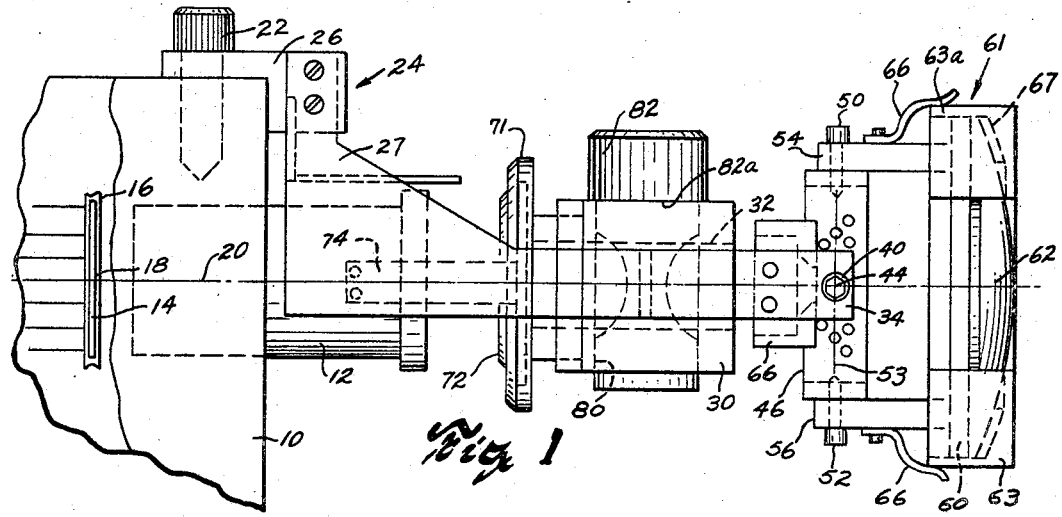
FIG. 1 is a side elevational view, with parts broken away, of a projector and lens demonstration apparatus embodying the present invention and showing an ophthalmic lens supported thereby.
Figure 4:
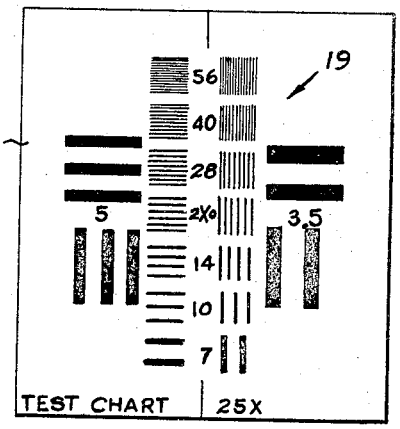
FIG. 4 is an enlarged view of a test chart on film such as might be used in the projection apparatus of FIG. 1.

Referring to the drawing in detail and in particular to FIG. 1, it will be seen that the numeral 10 indicates generally the forward part of a conventional slide or strip film projector housing having an objective 12 mounted therein. The optical axis of the objective is indicated at 20. The objective is axially adjustably arranged in the usual fashion for focusing upon a transparent film or the like 14 supported by suitable film-supporting means 16 within the housing and positioned at the focal plane of the objective. Thus, an enlarged image of information contained upon the film, such as indicated at 18 in FIG. 1, may be projected onto an associated viewing screen (not shown) in aligned spaced relation thereto. This information may be in the form of a test chart pattern printed on the transparent film, such as is indicated at 19 in FIG. 4.

Figure 2:
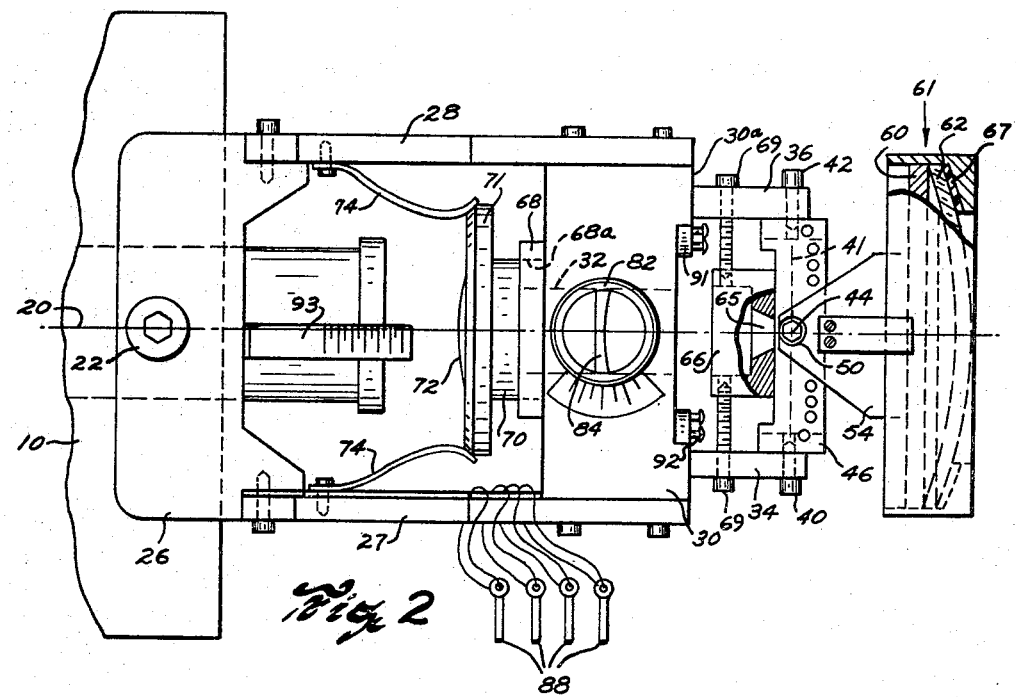
FIG. 2 is a plan view, with parts broken away, of the projector and lens demonstration apparatus of FIG. 1.

Detachably supported upon a front upper corner portion of the projector housing 10, by means of a set screw 22 or the like, is a rigid main supporting frame 24. This supporting frame, as also shown in FIG. 2, comprises a cross bar 26 shaped to fit firmly against the front upper corner of the housing 10 and through which the set screw 22 extends. Side rails 27 and 28 extend forwardly from the opposite ends of cross bar 26 and carry between their forward ends a rigid block-like supporting member 30.

Centrally located in this rigid supporting member 30, is a longitudinally arranged bore 32 aligned with the objective 12 and this bore is of such a diameter as to allow the projection beam from the objective 12 to pass therethrough. Spaced short supporting arms 34 and 36 are secured to the front face 30a of supporting member 30 at opposite sides of bore 32 and these arms carry aligned pivot pins 40 and 42 which are transversely disposed and arranged so as to have their common axis 41 intersect the optical axis 20 at a central point 44.

Figure 3:
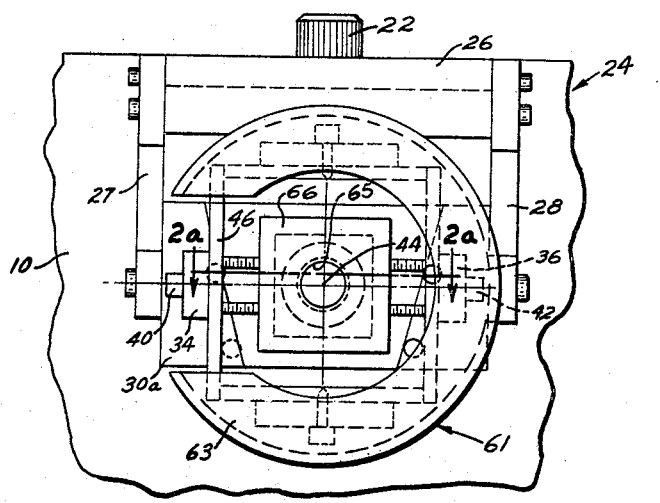
FIG. 3 is an end view of the apparatus of FIG. 1 but with the lens removed.

A substantially square hollow frame 46 (see also FIG. 3) is pivotally carried by pivot pins 40 and 42 which extend into left and right side bars of the frame for enabling angular tilting adjustment of the frame in a vertical direction about axis 41. In central portions of the upper and lower cross bars of frame 46 are arranged vertically aligned holes for receiving a second pair of pivot pins 50 and 52. These pins likewise have a common axis 53 which is similarly arranged to intersect optical axis 20 at common central point 44. These pivot pins 50 and 52 extend through and pivotally support upper and lower rigid arms 54 and 56 of a swingable plate-like lens-supporting member 60 for lateral pivotal movement about axis 53. This member 60 is thus pivotally mounted for limited arcuate universal movement in any direction about point 44 from its straightforward position shown in FIGS. 1 and 2 to various angular positions while being maintained at a fixed distance from point 44.

Member 60, in fact, is of a semi-circular or horseshoe shape and against the flat front face of this member, as shown in FIGS. 1 and 2 is held an ophthalmic lens 62 to be demonstrated. The lens is releasably secured in place by a retaining collar 63 which is of substantially the same shape and carries a flexible liner 67 of similar shape for yieldably engaging and retaining the lens in place. Collar 63 has a rearwardly extending semicircular flange 63a which is engaged at upper and lower edge portions by spring arms 66 for frictionally restraining collar 63 in place. Thus, these parts constitute a universally swingable lens holder 61.

An aperture stop for restricting the projection beam substantially to axial and paraxial light rays is shown at 65 in block 66 and this block is supported and retained in axial alignment with the objective 12 by screw bolts 69 extending through opening in side bars 34 and 36 and into the block. The reason for providing the plate-like member 60 and the lens retaining collar 63 in semi-circular form, as mentioned above, is so that these parts may be swung, while supporting a lens for testing, laterally various angular amounts up to and including 40° without having any part of the narrow projection beam which passes through the aperture stop 65 intercepted by edge portions of either plate 60 or the lens retaining collar 63 carried thereby.

Since the apparatus of the present invention is intended for demonstrating and the testing of both spherical and toric prescriptions, there is provided, for compensating purposes when toric lenses are being tested, upon the rear face of block-like supporting member 30, a retaining plate 68 which has a circular opening 68a formed therein. This opening has a larger diameter than the diameter of bore 32 and is arranged in concentric relation with the optical axis 20 so as to receive and rotatably retain and form a seat for a tubular member 70 which has a lens supporting flange portion 71 formed on its outer end. A cylindrical lens 72 supported and secured within a shallow recess in this flange portion 71 is for compensating purposes and is of a plano-cylindrical type. Preferably, it would have substantially opposite cylindrical power to that of adjustable cylindrical lens 84.

Lens supporting means 70, 71 thus make it possible to rotate compensating lens 72 in its own plane, usually only small amounts, while being retained in optical alignment with projector objective 12 and aperture stop 65. Spring arms 74 serve to hold lens supporting means 70, 71 seated during use of the apparatus. However, spring means 74 may be easily depressed and moved out of the way when it is desired to replace lens 72 and its supporting assembly by a similar assembly but having a lens of opposite or different cylindrical dioptric power. Rotation of lens 72 enables the operator of the apparatus to erect the image being projected through ophthalmic toric lens 62 and onto the viewing screen. It is primarily useful for fine adjustment of the instrument before the ophthalmic lens is positioned thereon but also may thereafter be used for minor adjustment when the cylinder axis of the ophthalmic lens, after adjustment, is not disposed exactly in a truly vertical or horizontal position.

Within the block-like supporting member 30 is also provided a vertically extending bore 80 for receiving a rotatable lens holder 82 for a second adjustable lens 84 of a cylindrical type. Holder 82 is shouldered at 82a so as to rest upon the top surface of block-like member 30 at all times while in operation. Also, a mark is provided upon holder 82 and a scale 83 on block 30 for indicating angular adjustments of the lens 84. Lens holder 82 is thus arranged for rotation about a vertically disposed axis which is arranged so as to substantially intersect the optical axis 20. Furthermore, cylindrical lens 84 is so disposed in this holder that its axis is substantially parallel to the axis of rotation of holder 82. Thus, holder 82 and lens 84 may be used to adjustably vary by rotation thereof the effective cylindrical power of the system including the ophthalmic lens being tested when same is a toric lens, or used to add a cylindrical power to the sphere meridian of this lens, when desired, without significantly changing the dioptric power of the system in the meridan at right angles thereto. Furthermore, holder 82 may be easily vertically withdrawn from bore 80 whenever it is desired that an assembly having a lens of a different cylindrical power be used in its place.

It follows, therefore, that should a spherical lens of a +3.00D prescriptive power, for example, be properly positioned in lens holder 61 and a cylindrical lens of a −3.00D power be employed within the rotatable holder 82, and a cylinder of approximately +3.00D be used as lens 72 in holder 71 and the proper adjustment of focus and axis be made, the test chart image projected therethrough and onto the associated viewing screen will exhibit the proper refractive characteristics, which would be provided by a lens of a spherical prescription of +3.00D power. Or if the lens in holder 61 is a toric lens with a +3.00D power in one meridian and with a cylinder power of −2.00D, yielding a +1.00D power in the other meridian, the proper focus can be obtained by rotating lens holder 82. This adjusts lens 84 to yield a stronger cylinder power in one meridian and a +3.00D power in the other meridian. Thus, by the use of various different combinations of lenses, a wide range of prescriptive values can be provided and demonstrated in the apparatus. However, if the lens holder 61 is then swung various amounts laterally, or vertically, or combination of both, changes in the condition of the screen image through edge portions, or intermediate portions of the lens under test as compared with the screen image as provided through the center of the same lens can be readily compared.

In order that the swingable lens holder or head 61 may be limited in its vertical displacement about axis 41 and thus about point 44, two series of holes 86 and 87 are provided in a side bar of frame 46 above and below supporting arm 34, respectively, and into any one of these holes may be placed a restraining pin 88. In order to limit lateral or sidewise swinging movement of head 61 about axis 53 and thus point 44 two similar series of holes 89 and 90 are provided in the top bar of frame 46 and at opposite sides of the swingable rigid arm 54.

Figure 2A:
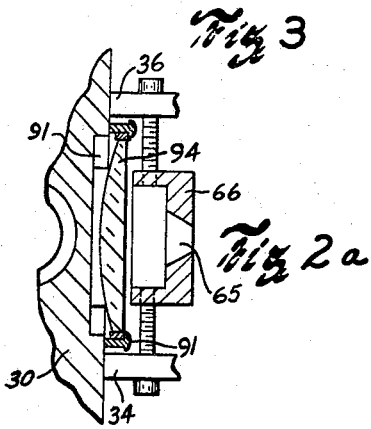
FIG. 2a is a fragmentary view of a part of the structure shown in FIG. 2 but additionally showing auxiliary lens means for use in extending the range of the apparatus.

In FIGS. 2 and 2a is shown a relatively wide vertically extending groove or channel 91. This channel is provided centrally in the vertical front surface of block-like member 30, and two pairs of vertically spaced pins 92 are provided in the member 30 at opposite sides of this groove. The purpose of the pins is to support an auxiliary cylindrical lens 94 of known character (such one of known dioptric power taken from an ordinary trial lens set) in an operative positon in optical alignment in the projection apparatus. Thus, groove 91 will accommodate such a lens, particularly when of appreciable dioptric power and curvature, in place in the system and resting upon pins 92. When such an auxiliary lens is used in the apparatus, it may be desirable to pre-set the objective at a particular position and a graduated bar 93 carried by cross bar 26 is provided for this purpose.

Figure 5:
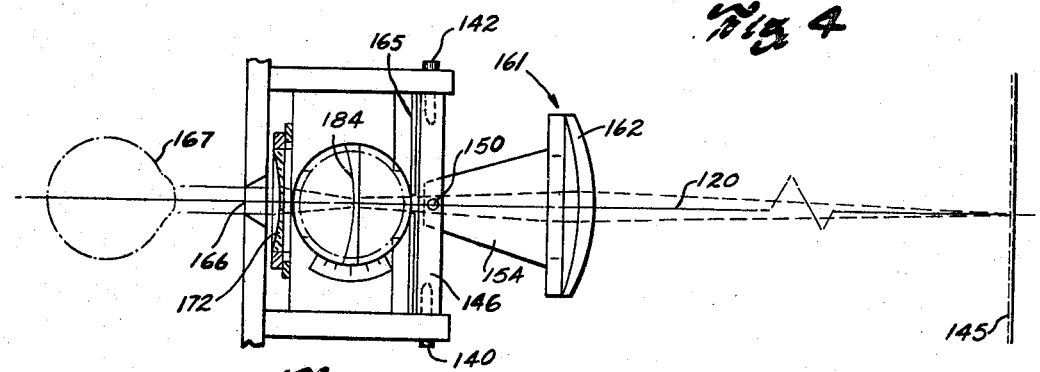
FIG. 5 is a diagrammatic showing of a modified form of lens demonstration apparatus embodying the present invention.

In FIG. 5 is shown a modified form of the apparatus embodying the invention, and which is likewise adapted and arranged for use in comparing, testing and demonstrating lenses of different kinds wherein a test chart or the like 145 of conventional kind is positioned at a proper distance from the apparatus and viewed through the apparatus. In this modified apparatus, a swingable head 161 is arranged, as in the earlier-described modification, to receive and support an ordinary ophthalmic lens 162 disposed in contact with a flat forward face thereof during testing or demonstration of the lens. The head is pivotally carried by a pair of upper and lower supporting arms 154 for limited sidewise swinging movement or adjustment about a pair of aligned upper and lower pivot pins 150 which extend into a hollow rectangular supporting frame 146 and thus have their common axis intersecting the optical axis 120 of the system at a predetermined axial point or location.

Frame 146, in turn, is pivotally supported for limited vertical tilting movement by a pair of aligned pivot pins 140, 142 which also have their common axis intersecting the optical axis 120 substantially at the same common point or location mentioned above. Thus, the head 161 is arranged for limited universal pivotal movement about said single predetermined fixed axial point (not shown) but corresponding to point 44 in FIGS. 1–3. Closely adjacent this single axial point is an apertured diaphragm 165 for restricting the size of the bundle of light rays from target 145 which can pass therethrough. A second diaphragm 166 of the same size and aligned therewith serves to locate the eye position 167 of the person using the apparatus. Of course, the parts of the structure just described would be arranged to allow the amounts of vertical and lateral pivoting of frame 146 needed for supplying adequate angling of lens 162.

Since ophthalmic lens 162 may be a lens having a toric prescription, a cylindrical compensating lens is provided at 172 between aperture means 165 and 166 and would be carried by suitable means (not shown) for rotational movement in its own plane and about optical axis 120. This lens 172, like lens 72 in FIG. 1, is for erecting the image of the test chart being observed through the apparatus as well as for compensating the minimum power value of lens 184.

Another cylindrical lens 184 is likewise disposed in path of the light rays between aperture means 165 and 166 and has its cylindrical axis disposed in a vertical direction. Thus, this lens would be arranged for pivotal movement about a vertical axis parallel to its own cylindrical axis, and will, when rotated, in effect, adjustably vary in a continuous fashion the cylindrical power of the system including the ophthalmic lens 162 being tested or demonstrated in one meridian thereof without materially altering the power of the system in another meridian at right angles thereto.

It will be appreciated from an inspection of the apparatus of FIG. 5 that even though the ophthalmic lens may be moved both laterally and vertically to various different positions of adjustment about a fixed axial point or location while being maintained at a constant distance therefrom (corresponding to the center-of-rotation to ocular vertex distance desired for the lens), nevertheless, a person looking from eye position 167 through the apparatus to test chart 145 will always be looking through this single fixed axial point and simultaneously through only a small or restricted area of the lens. Thus, when this small or restricted area is aligned with an edge portion or an intermediate portion of the lens, the test chart may look quite different than it would when viewed through the center of the lens.

Having described my invention, I claim:

1. Apparatus for use in visually displaying by means of an enlarged projected image upon a viewing screen differing refractive characteristics of different spherical or toric ophthalmic lens, said apparatus comprising a main supporting structure, means coupled to said supporting structure for attaching said structure to a conventional film projector in optical alignment with the objective thereof, said apparatus comprising a supporting frame carried by said structure and having parts extending forward of the normal focusing positions of said objective, a supporting member carried thereby having an aperture therein of small size as compared to the size of an ordinary un-edged opthalmic lens, said aperture being disposed in optical alignment with and substantially transverse to the optical axis of the objective of said projector and being of such size as to allow only a narrow beam of substantially paraxial and near paraxial rays from said objective to pass therethrough, a swingable head having a forwardly facing transversely disposed lens engaging surface of at least semi-circular peripheral edge shape thereon and of such size as to receive and support a conventional un-edged ophthalmic lens held thereagainst in centered concentric relation to said semi-circular peripheral edge, pivotal means connecting said head to said supporting member in such a manner as to allow only universal pivotal movement of said head about a predetermined fixed central point in said apparatus, said predetermined fixed central point being a point located on said optical axis closely adjacent said aperture, said pivotal means and said head jointly serving to space the ocular vertex of said un-edged ophthalmic lens when in its centered position upon said head at a constant predetermined distance from said fixed central point which is substantially equal to the average center-of-rotation-to-ocular-vertex distance employed for large members of persons needing such a conventional ophthalmic lens, said pivotal connection and said head being arranged to position said lens in a centered position relative to said optical axis and to allow limited arcuate movement of said head and lens therefrom in any transverse direction relative to said narrow beam of light rays, whereby when a test chart image is projected by said projector through said aperture and said lens onto said viewing screen the image thereon will display refractive characteristics of that part of said lens traversed by the light rays of said narrow beam and when said head and lens are jointly moved to a different position of projection through a different part of said lens different refractive characteristics of that part of said lens, if present, may be observed upon said screen.

2. The combination defined in claim 1 in which a cylindrical compensating lens of substantially equal power to that of one meridian of said un-edged ophthalmic lens is carried by said apparatus and positioned in said beam with its cylinder axis transverse thereto, and means is provided for adjustably mounting said cylindrical lens upon said supporting frame for rotational movement in a transverse plane at right angles to said light beam for removing aberrations in the projected image.

3. The combination defined in claim 1 in which a cylindrical lens of predetermined dioptric power but opposite power to that of said ophthalmic lens is positioned in said beam by support means which is adjustably mounted for rotational movement about an axis transversely disposed relative to the projection beam for varying the dioptric power of said ophthalmic lens in one meridian thereof and without materially altering its dioptric power in a second meridian at right angles thereto.

References Cited

UNITED STATES PATENTS

| 2,114,282 | 4/1938 | Ames et al. | 88—56 |
| 1,241,612 | 10/1917 | Emerson | 88—56 |

RONALD L. WIBERT, Primary Examiner

T. R. MOHR, Assistant Examiner

U.S. Cl. X.R.

356—127